UNITED STATES PATENT OFFICE.

HENRY S. ZIEGLER, OF PHILADELPHIA, PENNSYLVANIA.

IMPROVEMENT IN STOVE-POLISHING COMPOUNDS.

Specification forming part of Letters Patent No. 203,309, dated May 7, 1878; application filed March 5, 1878.

*To all whom it may concern:*

Be it known that I, HENRY S. ZIEGLER, of the city of Philadelphia and State of Pennsylvania, have invented a new and useful Compound Paste Stove-Polish, which compound is fully described in the following specification.

This invention relates to that class of compounds used to polish stoves with; and it consists in a composition of a paste formed by mixing plumbago, tallow-oil, cetaceum, caustic soda, oleum terebinthinæ, and aqua fontana, in such proportions as to make a paste, suitable for immediate and constant use, for the polishing of stoves.

To prepare the compound stove-polish, take of plumbago, three hundred and fifty pounds; of tallow-oil, twenty-five pounds; of cetaceum, twenty-five pounds; of caustic soda, five pounds; of oleum terebinthinæ, ten pounds; and of aqua fontana, eighty gallons, and mix them together by boiling the ingredients in a steam-boiler until a proper consistency is reached and the compound is perfected.

Other modes of mixing, and different proportions of the ingredients mentioned, may be found more or less effective; but I prefer to use the said ingredients in the proportions named, and to mix them in the manner described.

This compound paste stove-polish will keep in any climate, produce a brilliant surface upon stoves, with or without a brush, and has the advantage over all the stick and powder polishes now in use of being always ready for immediate application, direct from the package containing it, without the application of water or anything foreign to itself.

I am aware that plumbago combined with soap is commonly used in stove-polishes, and I therefore disclaim the invention of such compositions so compounded, limiting myself only to the composition herein described.

What I claim as my invention, and desire to secure by Letters Patent, is—

A compound for stove-polish made of the following ingredients, viz: plumbago, three hundred and fifty pounds; tallow-oil, twenty-five pounds; spermaceti, twenty-five pounds; caustic soda, five pounds; oil of turpentine, ten pounds; and water, eighty gallons, in the manner substantially as described.

HENRY S. ZIEGLER.

Witnesses:
SAMUEL YEO,
H. J. DREHER.